VAN NESS DAVIS.
Scraping Instruments.
No. 135,699. Patented Feb. 11, 1873.
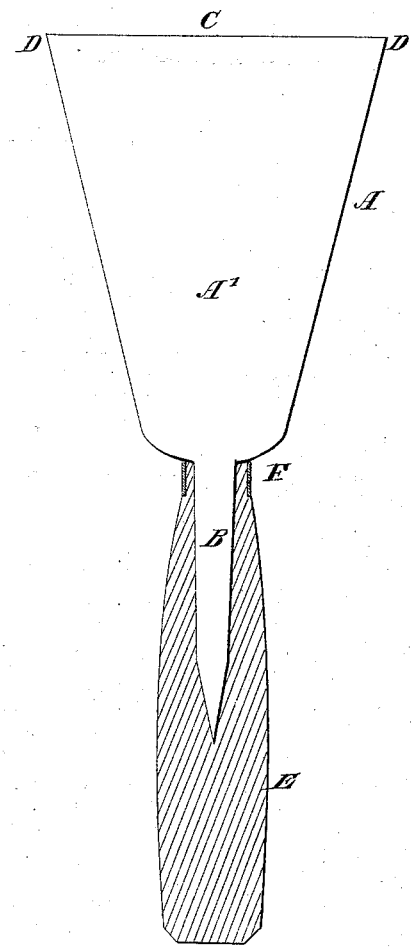

UNITED STATES PATENT OFFICE.

VAN NESS DAVIS, OF STONEHAM, MASSACHUSETTS, ASSIGNOR TO HIMSELF AND FRANK A. DAVIS, OF SAME PLACE.

IMPROVEMENT IN SCRAPING INSTRUMENTS.

Specification forming part of Letters Patent No. 135,699, dated February 11, 1873.

*To all whom it may concern:*

Be it known that I, VAN NESS DAVIS, of Stoneham, in the county of Middlesex and State of Massachusetts, have invented a new and useful Improvement in Tool for Scraping, of which the following is a specification:

The object of this invention is to furnish a tool or implement for scraping kitchen utensils, and cleaning the corners or angles of deposits of burned gravy or other sedimentary deposits, and also to be used in house-cleaning for removing dirt and dust from corners around doors, windows, mop-boards, and moldings; and it consists in a simple flat blade with the scraping-edge at the end, and with a shank and handle, the construction being as hereinafter described.

The accompanying drawing is a view of my improved scraping-tool, the handle being shown in longitudinal section.

Similar letters of reference indicate corresponding parts.

A is the scraper. A' is a blade, made of thin plate-steel, having a shank, B, on its end, as seen in the drawing. This blade is expanded in width from the shank to the end or edge C, leaving two sharp corners, D D, for entering the angles in cooking utensils and wood-work where objectionable deposits accumulate. These corners, or either of them, may be right angles, if desired. The end C is not made a cutting-edge, but sufficiently sharp to scrape or loosen the burned deposits on gridirons, spiders, bake-pans, boilers, and similar articles. E is the handle. F is a ferrule around the handle.

The scraper may be made with an iron handle, and from a single piece of metal, if desired; but I prefer the wooden handle.

A knife or a spoon is usually employed where this implement is designed to be used. The former articles are not designed for such purposes, but are used because nothing better has been provided. With this scraping implement a want of the household which has long been felt is supplied.

Having thus described my invention, I claim as new and desire to secure by Letters Patent—

As a new and useful article of manufacture, the scraping implement A, substantially as and for the purposes described.

VAN NESS DAVIS.

Witnesses:
 JAMES A. PIERCE,
 GEO. E. HOOPER.